United States Patent [19]

Moore, Jr.

[11] Patent Number: 4,572,598

[45] Date of Patent: Feb. 25, 1986

[54] SALAD BAR FOR SUPERMARKETS AND RESTAURANTS

[76] Inventor: Franklin Moore, Jr., 902 McBurney Dr., Lebanon, Ohio 45036

[21] Appl. No.: 552,969

[22] Filed: Nov. 17, 1983

[51] Int. Cl.⁴ .................... A47B 97/00; A47B 57/00; A47F 3/04

[52] U.S. Cl. .................................... 312/284; 62/246; 108/96; 312/236; 312/116; 312/312

[58] Field of Search ............... 312/284, 285, 116, 236, 312/312, 196, 114, 140.1; 206/43.13, 43.45; 62/246, 256; 99/645; 211/207; 186/44; 108/38, 96

[56] References Cited

U.S. PATENT DOCUMENTS

| | | | |
|---|---|---|---|
| 893,155 | 7/1908 | Evans | 312/285 |
| 2,518,764 | 8/1950 | Dunlap | 312/285 |
| 3,162,495 | 12/1964 | Swift | 186/44 |

OTHER PUBLICATIONS

Promotional Sheet "Hubie".
Promotional Sheet Hubert's.
Promotional Sheet Cambro.
Promotional Sheet Amtekco Industries, Inc.
Promotional Sheet Continental Carlisle.
Promotional Sheet Yorkraft.
Promotional Sheet Zesco Products.

*Primary Examiner*—William E. Lyddane
*Assistant Examiner*—Gerald Anderson
*Attorney, Agent, or Firm*—Jacox & Meckstroth

[57] ABSTRACT

A self-serve type of salad bar for supermarkets and restaurants. The salad bar comprises a base which supports a table. The table supports a container for fruits and vegetables and for ice. A cover member is supported above the container by posts which are movable to an upper position to position the cover in an upper position to provide access to the container and the contents thereof. In its upper position, the cover serves as a shield to prevent contamination of the contents of the container. The posts and the cover are movable to a lower position in which the cover closely encloses the container and prevents access to the container. Readily adjustable support members support the posts in the upper position thereof and prevent accidental lowering of the posts and the cover.

7 Claims, 9 Drawing Figures

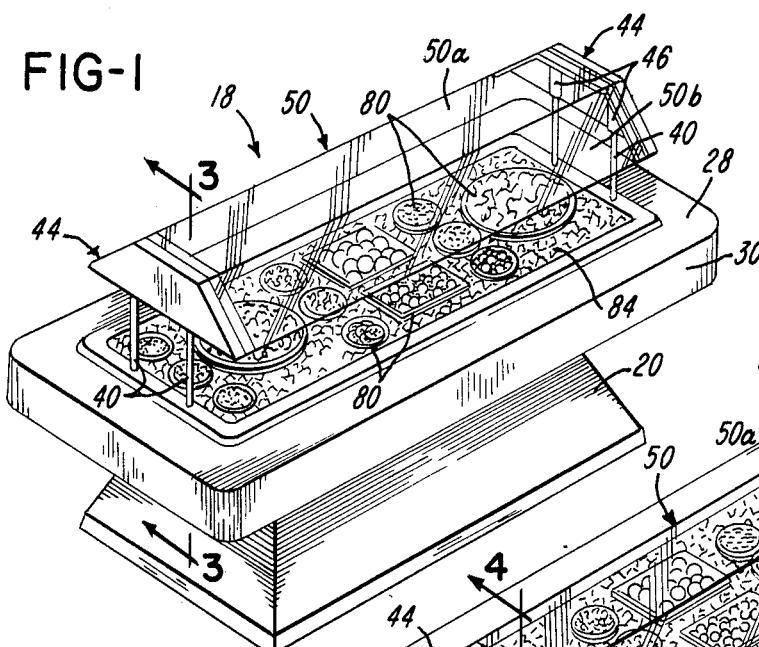
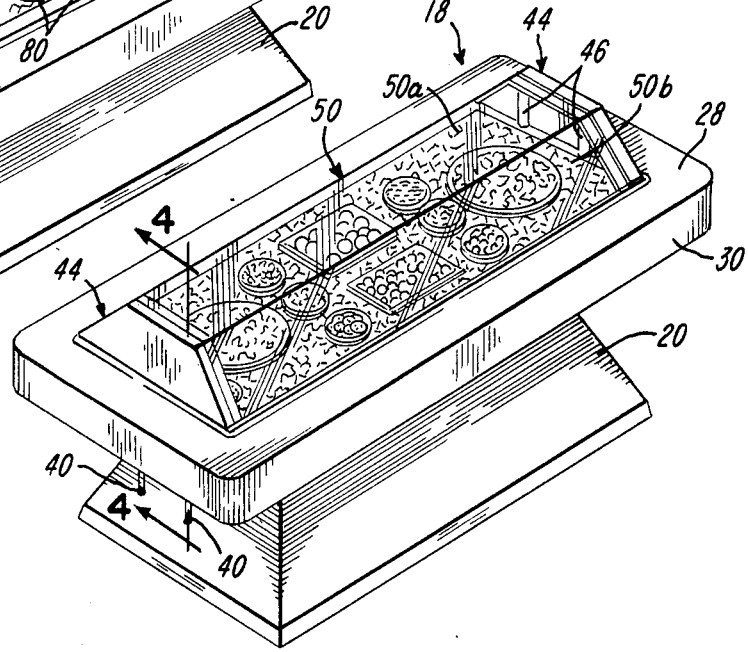
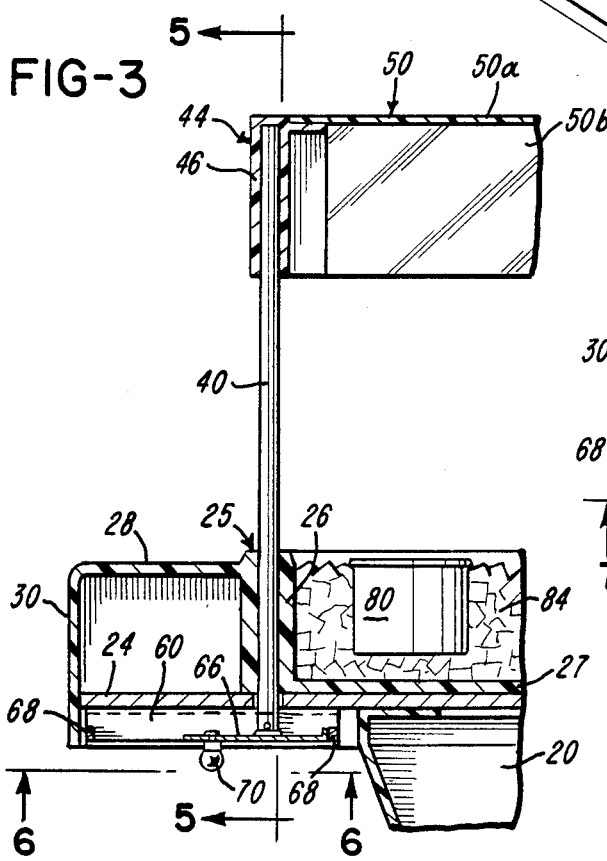
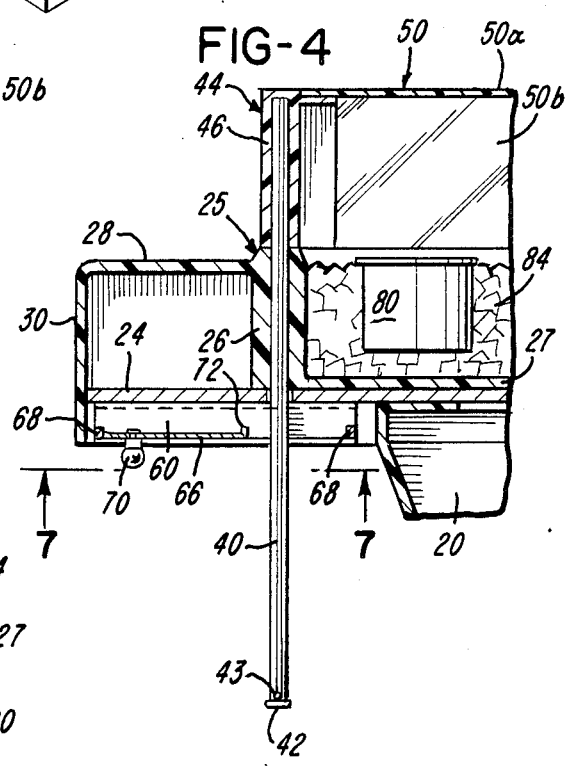

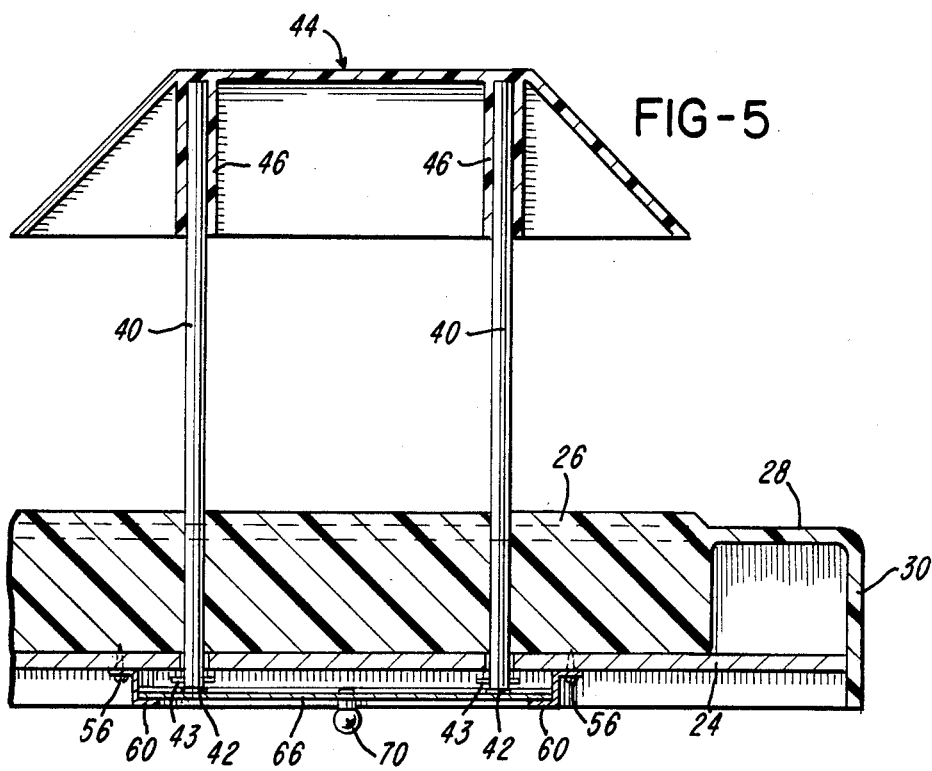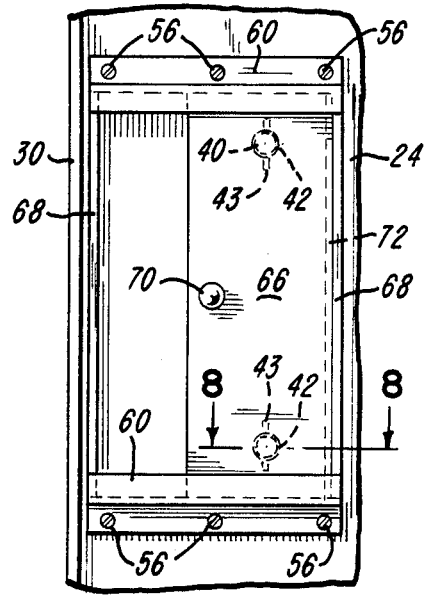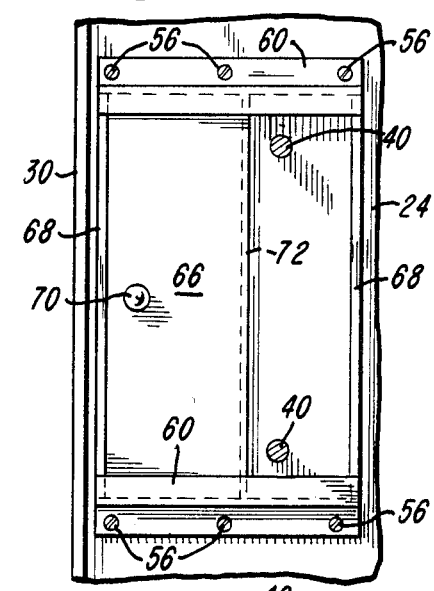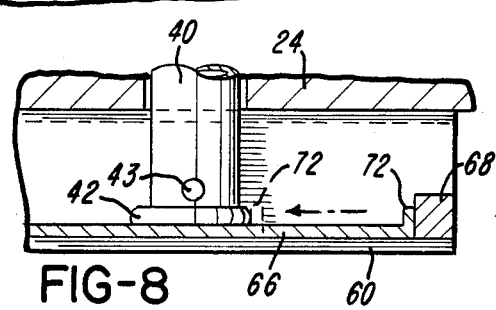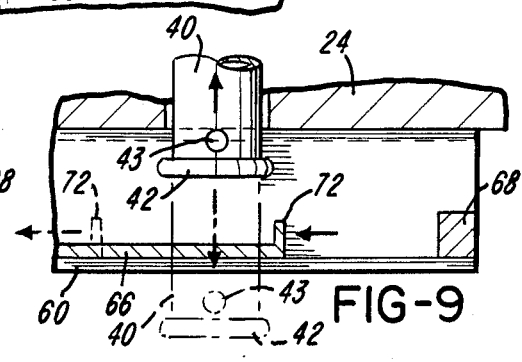

SALAD BAR FOR SUPERMARKETS AND RESTAURANTS

BACKGROUND OF THE INVENTION

Situations frequently occur in a supermarket vegetable and fruit department in which the quantity of a given type or kind of vegetable or fruit is insufficient to justify a separate table, or bin, or counter. Also, situations frequently occur in which a portion of the vegetable or fruit becomes not fit for sale, while other portions thereof are suitable for sale. In such situations the small quantities of vegetables or fruits can be sold in a profitable manner if properly displayed.

A self-serve salad bar is available in numerous restaurants, and certain problems occur in the use and maintenance thereof and with regard to preservation of the foods displayed thereon.

It is an object of this invention to provide a salad bar by which relatively small quantities of vegetables, fruits and other foods in a supermarket can be displayed and profitably sold.

It is another object of this invention to provide such a salad bar which is pleasing in appearance and which makes possible the attractive display of a variety of vegetables, fruits and other foods for the sale thereof in a supermarket or in a restaurant.

It is another object of this invention to provide such a salad bar which includes a cover member which is adjustable in height.

It is another object of this invention to provide such a salad bar which includes a cover member which is movable to a predetermined height to serve as a shield to prevent contamination of the foods as the foods are displayed and dispensed.

It is another object of this invention to provide such a salad bar which includes a cover member which is movable to a position to enclose the contents of the salad bar.

Other objects and advantages of this invention reside in the construction of parts, the combination thereof, the method of production and the mode of use, as will become more apparent from the following decription.

SUMMARY OF THE INVENTION

This invention comprises a base which supports a table. The table supports a container which is adapted to contain and support several receptacles of vegetables and/or fruits or other foods and which is also adapted to contain a refrigerant material, such as ice or the like, which encompasses the receptacles.

Positioned above the container is a cover member which is supported by means which permit the cover member to be adjusted in elevation to shield the foods against contamination during self-serve use of the salad bar. The support means also permit the cover member to be moved to a position to engage the container to enclose the container, and to prevent access to the container.

BRIEF DESCRIPTION OF THE VIEWS OF THE DRAWINGS

FIG. 1 is a perspective view of a salad bar of this invention with the cover member thereof in a raised position.

FIG. 2 is a perspective view, similar to FIG. 1, showing the cover member in its lowermost position.

FIG. 3 is an enlarged fragmentary sectional view taken substantially on line 3—3 of FIG. 1.

FIG. 4 is an enlarged fragmentary sectional view taken substantially on line 4—4 of FIG. 2.

FIG. 5 is a fragmentary sectional view taken substantially on line 5—5 of FIG. 3.

FIG. 6 is a fragmentary sectional view taken substantially on line 6—6 of FIG. 3.

FIG. 7 is a fragmentary sectional view taken substantially on line 7—7 of FIG. 4.

FIG. 8 is an enlarged fragmentary sectional view taken substantially on line 8—8 of FIG. 6.

FIG. 9 is an enlarged fragmentary sectional view, similar to FIG. 8, illustrating the manner by which the cover support portion of the structure is adjusted.

DETAILED DESCRIPTION OF THE PREFERRED EMBODIMENT

A salad bar 18 of this invention comprises a base 20 which may be of any suitable configuration. The base 20 supports a substantially flat table 24 which is attached to the base 20 in any suitable manner, not shown. Mounted upon the table 24 and attached thereto in any suitable manner, not shown, is a container 25, provided with an enclosing wall 26 and a floor 27. Encompassing the enclosing wall 26, adjacent the upper portion thereof, is a relatively flat deck or counter 28 having a substantially vertical flange 30 extending downwardly from the deck 28. The flange 30 also encompasses the table 24, as shown in FIGS. 3, 4, and 5.

As illustrated in FIGS. 1 and 2, the salad bar 18 of this invention is generally rectangular in shape, but may be of any other suitable desired shape.

A pair of spaced-apart, substantially vertical posts 40 extend through the wall 26 and through the table 24, adjacent each end of the table 24, as shown in FIGS. 1, 3, 4, and 5. At the lower end of each of the posts 40 is a foot 42, which may be of any suitable material and of any desired configuration. A pin 43 is carried by each post 40 immediately above its respective foot 42.

Attached to the upper portion of each pair of the posts 40 is a bracket 44. Each bracket 44 includes a pair of sleeves 46 which are integral therewith and which are attached to the respective pair of posts 40, as shown in FIGS. 3, 4, and 5.

Attached to the bracket 44 at each end of the table 24 and extending therebetween is a cover 50, which may be of any suitable material, such as plastics, glass, and the like. The cover 50 is shown as having a substantially flat central portion 50a, and two sloping side portions 50b. Preferably, at least a portion of the cover 50 is transparent.

As stated above and as shown in FIGS. 1, 3, 4, 5, 8, and 9, each of the posts 40 extends through the wall 26 and through the table 24. Attached to the lower surface of the table 24, adjacent each end portion thereof, by means of screws 56 or the like, is a pair of spaced-apart Z-shape channel members 60, best shown in FIG. 5. Slidably mounted upon the channel members 60 and extending therebetween is a shelf 66. At each end of each of the channel members 60 is an abutment member 68 which limits the travel of the shelf 66 upon the channel members 60. The lower surface of each shelf 66 has a knob 70 attached thereto for movement of the shelf 66. Each shelf 66 has an upwardly extending flange 72, best shown in FIGS. 8 and 9.

The posts 40 are movable upwardly and downwardly to move the cover 50 to an upper position, shown in FIG. 1, and to a lower position, shown in FIG. 2.

When the cover 50 is in its upper or raised position, as shown in FIGS. 1, 3, and 5, the posts 40 are in an upper position, and the shelf 66 at each end portion of the table 24 is positioned below the posts 40 to support the posts 40, as shown in FIGS. 3, 5, 6, and 8. When it is desired to lower the cover 50 to the position thereof shown in FIGS. 2, 4, and 7, the posts 40 are lifted slightly to permit the shelf 66 at each end portion of the table 24 to be moved horizontally, as illustrated in FIG. 9. The posts 40 are lifted sufficiently to permit the upwardly extending flange 72 of the shelf 66 to move below the posts 40, as illustrated in FIG. 9. The pins 43 limit the movement of the posts 40. Thus, in order to lower the cover 50, each shelf 66 is moved from a supporting position below the posts 40. The cover 50 cannot be accidentally lowered, due to the fact that the posts 40 must be raised slightly, as illustrated in FIGS. 9, to permit the upwardly extending flange 72 of each shelf 66 to pass under the respective posts 40, before the posts 40 can be lowered.

Thus, the posts 40 are permitted to be lowered to a position in which the brackets 44 and the cover 50 engage the wall 26, as illustrated in FIGS. 2 and 4. In this position of the cover 50, the posts 40 extend below the table 24, as shown in FIG. 4. In this position of the cover 50, the container 25 is enclosed and the contents thereof are protected and not accessible. Therefore, it is not necessary to remove the contents of the container 25 when the salad bar 18 is not in use.

The container 25, formed by the walls 26 and the floor 27, is adapted to contain receptacles 80 of any suitable or desired size and configuration which contain vegetables or fruits, or other foods. The container 25 also contains ice 84 which supports and encompasses the receptacles 80.

Thus, it is understood that the foods in the receptacles 80 are attractively displayed and readily accessible when the cover 50 is in its upper position as shown in FIGS. 1, 3, and 5. The cover 50, in its upper position, serves as a shield to prevent nose and mouth discharge from contaminating the foods in the container 25 as people obtain foods from the receptacles 80.

Although the preferred embodiment of the salad bar of this invention has been described, it will be understood that within the purview of this invention various changes may be made in the form, details, proportion and arrangement of parts, the combination thereof, and the mode of use, which generally stated consist in a salad bar within the scope of the appended claims.

The invention having thus been described, the following is claimed.

1. A salad bar for foods and adapted for self-serve use by persons obtaining foods therefrom, comprising:
a base,
a table supported by the base,
a container supported by the table and adapted to contain foods,
a transparent cover member,
support means supporting the cover member for movement between a lower position in which the cover member encloses the container to prevent access to the container and an upper position in which the cover member is spaced above the container to permit access to the container by persons in self-serve use, while preventing contamination of the contents of the container by persons obtaining foods from the container,
the support means including substantially vertical posts which are axially movable between an upper position and a lower position with respect to the table, means attaching the posts to the cover member, engagement means carried by the table and movable to a position below the posts to support the posts and the cover member in the upper positions thereof, the engagement means being movable to a position laterally spaced from the posts for positioning the cover member and the posts in the lower positions thereof.

2. A salad bar for foods and adapted for self-serve use by persons obtaining foods therefrom, comprising:
a base,
a table supported by the base,
a container supported by the table and adapted to contain foods,
a transparent cover member,
support means supporting the cover member for movement between a lower position in which the cover member encloses the container to prevent access to the container and an upper position in which the cover member is spaced above the container to permit access to the container by persons in self-serve use, while preventing contamination of the contents of the container by persons obtaining foods from the container,
the support means including substantially vertical posts which are axially movable between an upper position and a lower position with respect to the table, means attaching the posts to the cover member, the cover member being in its upper position when the posts are in the upper position thereof, shelf means carried by the table and movable to a position below the posts to support the posts and the cover member in the upper positions thereof, the shelf means being movable to a position laterally spaced from the posts for positioning the cover member and the posts in the lower position thereof, the shelf means including flange means engageable with the posts to prevent the shelf means from movement to a lateral position with respect to the posts when the posts and the cover member are in the upper positions thereof, thus preventing accidental lowering of the posts and the cover member, the posts being movable upwardly above the upper position thereof to permit the shelf means, including the flange means to be moved to said laterally spaced position with respect to the posts for lowering the posts and the cover member to the lower positions thereof.

3. A food bar adapted to have foods dispensed therefrom by persons functioning in a self-serve manner, comprising:
first support means, the first support means being adapted to support foods arranged for access by persons positioned adjacent the first support means,
second support means, the second support means being supported by the first support means and movable upwardly and downwardly with respect to the first support means,
a cover member supported by the second support means and movable upwardly and downwardly with upward and downward movement of the second support means, third support means, the third support means having a first position for supporting the second support means and the cover member in an upper position above the first support means, the cover member in its upper position preventing contamination of the foods by persons self-serving the foods from the first support means, the third support means having a second position in which the third support means does not support the second support means, the second position of the third support means permitting the second support means and the cover member to be lowered to a lower position in which the cover member closely encloses at least a portion of the first support means to prevent access to the foods which are supported by the first support means, the second support means comprising a plurality of substantially vertical posts, means for attaching the posts to the cover member, the third support means comprising at least one substantially horizontal shelf which is movable to a position below the posts and which is movable to a position laterally spaced from the posts.

4. A food bar adapted to have foods dispensed therefrom by persons functioning in a self-serve manner, comprising:

first support means, the first support means being adapted to support foods arranged for access by persons positioned adjacent the first support means, second support means, the second support means being supported by the first support means and movable upwardly and downwardly with respect to the first support means, a cover member supported by the second support means and movable upwardly and downwardly with upward and downward movement of the second support means, third support means, the third support means having a first position for supporting the second support means and the cover member in an upper position above the first support means, the cover member in its upper position preventing contamination of the foods by persons self-serving the foods from the first support means, the third support means having a second position in which the third support means does not support the second support means, the second position of the third support means permitting the second support means and the cover member to be lowered to a lower position in which the cover member closely encloses at least a portion of the first support means to prevent access to the foods which are supported by the first support means, the second support means comprises a plurality of substantially vertical posts, means for attaching the posts to the cover member, the third support means comprising at least one substantially horizontal shelf which is movable to a position below the posts and which is movable to a position laterally spaced from the posts, the shelf having an upwardly extending flange which normally prevents movement of the shelf to a lateral position with respect to the posts when the posts are supported by the shelf, the posts being movable upwardly to permit the upwardly extending flange of the shelf to be moved laterally with respect to the posts for positioning the cover member in its lower position.

5. A salad bar adapted to have foods dispensed therefrom by persons functioning in a self-serve manner, comprising:

a base, a container supported by the base and adapted to contain foods, a transparent cover positionable in an upper position in spaced relationship above the container and providing visibility through the cover for viewing the foods, the cover in its upper position shielding the foods against contamination from nose or mouth discharge from persons serving from the container, the transparent cover being positionable in a lower position closely adjacent and above the container to prevent access to the container, support means supported by the base and supporting the cover, the support means being movable between an upper position and a lower position for movement of the cover between the upper position thereof and the lower position thereof, and securing means carried by the base and positionable below the support means to engage the support means to maintain the support means in the upper position thereof to maintain the transparent cover in the upper position thereof.

6. The salad bar of claim 5 in which the support means comprises a plurality of posts vertically movable with respect to the table, and in which the securing means comprises at least one shelf supported by the base and movable to a position to support the posts to retain the transparent cover in the upper position thereof, the shelf being movable to a lateral position with respect to the posts for downward movement of the posts to position the transparent cover in the lower position thereof.

7. The salad bar of claim 5 in which the support means comprises a plurality of posts supported by the base and vertically movable with respect thereto, at least one shelf supported by the base and movable to a position to support the posts to retain the transparent cover in the upper position thereof, the shelf being movable to a lateral position with respect to the posts for downward movement of the posts to position the transparent cover in the lower position thereof, the shelf including an upwardly extending abutment member which is engageable with the posts when the posts are in the upper position thereof to prevent accidental movement of the shelf to a lateral position with respect to the posts, but permitting the shelf to be moved to a lateral position with respect to the posts after the posts are moved to a position above the upper position thereof and above the abutment member.

* * * * *